(12) United States Patent
Presz-Lafreniere et al.

(10) Patent No.: US 12,281,753 B2
(45) Date of Patent: *Apr. 22, 2025

(54) LIGHT FIXTURE MOUNTING BRACKET ASSEMBLY

(71) Applicant: GLOBE ELECTRIC COMPANY INC., Montreal (CA)

(72) Inventors: Christopher Presz-Lafreniere, Dollard-des-Ormeaux (CA); Adam Chaimberg, Hampstead (CA); Xiong Xianwen, HangZhou (CN)

(73) Assignee: GLOBE ELECTRIC COMPANY INC., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,334

(22) Filed: Oct. 26, 2023

(65) Prior Publication Data

US 2024/0133515 A1 Apr. 25, 2024
US 2024/0230025 A9 Jul. 11, 2024

Related U.S. Application Data

(60) Continuation of application No. 17/846,432, filed on Jun. 22, 2022, now Pat. No. 11,859,792, which is a
(Continued)

(51) Int. Cl.
*F16M 13/02* (2006.01)
*F21S 8/00* (2006.01)
(Continued)

(52) U.S. Cl.
CPC .......... *F16M 13/027* (2013.01); *F21S 8/026* (2013.01); *F21S 8/03* (2013.01); *F21V 21/044* (2013.01);
(Continued)

(58) Field of Classification Search
CPC ...... F21S 8/026; F21V 21/044; F21V 21/047; F21V 21/14; F13M 13/027
See application file for complete search history.

(56) References Cited

U.S. PATENT DOCUMENTS 6,132,069 A 10/2000 Sato et al.
8,348,479 B2 1/2013 Tickner et al.
(Continued)

FOREIGN PATENT DOCUMENTS

CA 2552267 1/2007
CA 2846521 9/2014
(Continued)

*Primary Examiner* — Bradley Duckworth
(74) *Attorney, Agent, or Firm* — Gray Ice Higdon

(57) ABSTRACT

A mounting plate assembly has a mounting plate for mounting a light fixture in holes of different diameters and wherein a guide rail assembly is secured to a rear face of the mounting plate on opposed sides of an aperture. Each guide rail assembly has a novel displaceable spring clamp structure having to a displaceable base coupled for sliding displacement along a guide rail assembly. Spring biasing elements are provided between the displaceable base and the guide rail assembly to urge a bottom face of the displaceable base against a flat top surface of a mounting base to which the guide rails are secured. A retention formation is provided in the bottom surface of the displaceable base for retention coupling with a selected on of space-apart engageable retainers immovably secured to the flat top surface of the mounting base and aligned with the retention formation to arrest the displaceable base at a desired location to position the spring clamp structures at a desired location with respect to the size of a hole formed in the sheet material and to which a light fixture is to be secured.

20 Claims, 3 Drawing Sheets

Related U.S. Application Data division of application No. 17/575,801, filed on Jan. 14, 2022, now Pat. No. 11,530,778.

(51) Int. Cl.
- *F21S 8/02* (2006.01)
- *F21V 21/04* (2006.01)
- *F21V 23/00* (2015.01)
- *F21Y 115/10* (2016.01)

(52) U.S. Cl.
CPC .......... *F21V 21/047* (2013.01); *F21V 23/001* (2013.01); *F21V 23/003* (2013.01); *F21Y 2115/10* (2016.08)

(56) References Cited

U.S. PATENT DOCUMENTS

| | | |
|---|---|---|
| 8,523,409 B1 | 9/2013 | Drake et al. |
| 9,010,956 B1 | 4/2015 | Davis |
| 9,453,639 B2 | 9/2016 | Mandy et al. |
| 9,557,002 B2 | 1/2017 | Wong et al. |
| 9,803,814 B2 | 10/2017 | Grant |
| 10,072,805 B2 | 9/2018 | Bailey |
| 10,132,477 B1 | 11/2018 | Winters |
| 10,174,887 B2 | 1/2019 | Boulanger et al. |
| 10,267,503 B2 | 4/2019 | Yu et al. |
| 10,344,952 B2 | 7/2019 | Georgiev |
| 10,458,628 B2 | 10/2019 | Vidal et al. |
| 10,488,000 B2 | 11/2019 | Danesh et al. |
| 10,514,139 B2 | 12/2019 | Athalye |
| 10,731,830 B2 | 8/2020 | Feit et al. |
| 10,756,453 B2 | 8/2020 | Kimmel |
| 10,989,398 B2 | 4/2021 | Winters |
| 11,028,985 B1 | 6/2021 | Chaimberg |
| 11,231,169 B2 | 1/2022 | Hou et al. |
| 11,530,778 B1 | 12/2022 | Presz-lafreniere et al. |
| 11,859,792 B2 * | 1/2024 | Presz-Lafreniere ...... F21S 8/03 |
| 2019/0178453 A1 | 6/2019 | Zeng et al. |
| 2020/0378583 A1 | 12/2020 | Cheng et al. |
| 2020/0400292 A1 | 12/2020 | Elmvang |
| 2023/0228392 A1 | 7/2023 | Presz-lafreniere et al. |

FOREIGN PATENT DOCUMENTS

| | | |
|---|---|---|
| CN | 207146151 | 3/2018 |
| CN | 210319689 | 4/2020 |

* cited by examiner

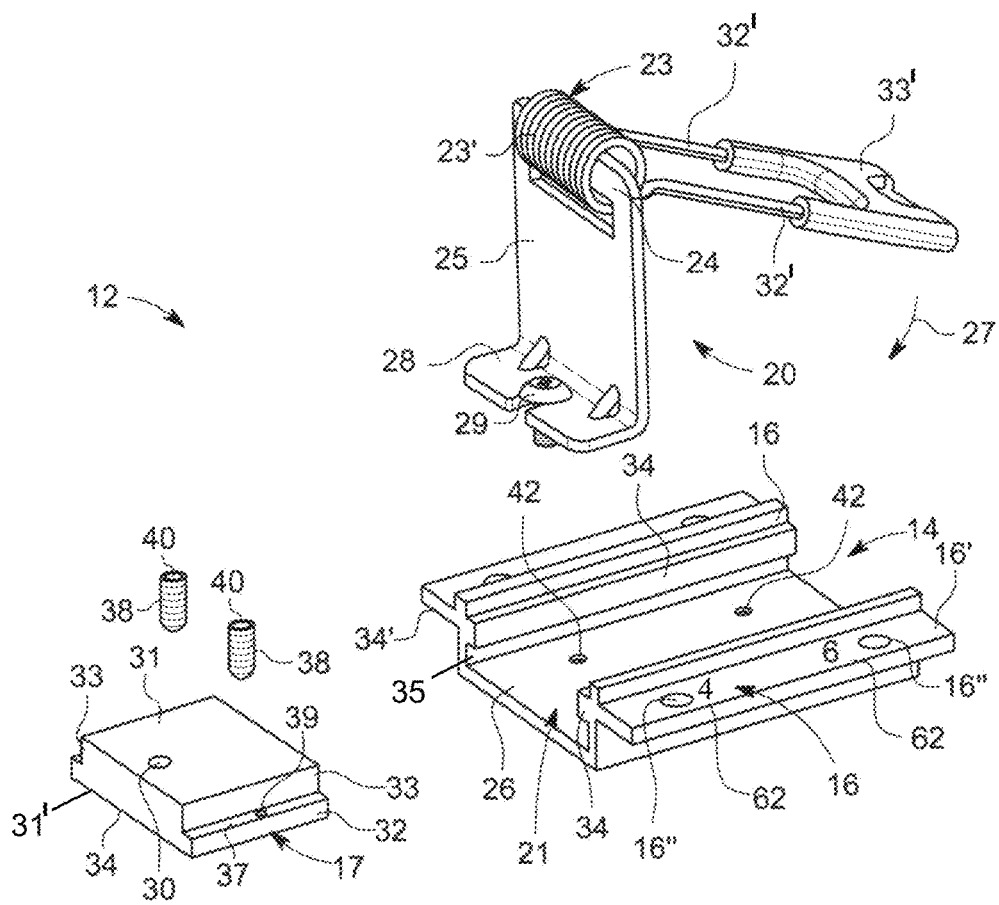
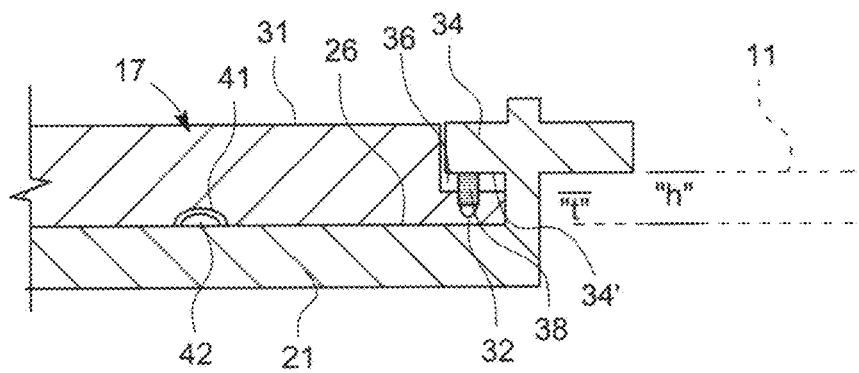
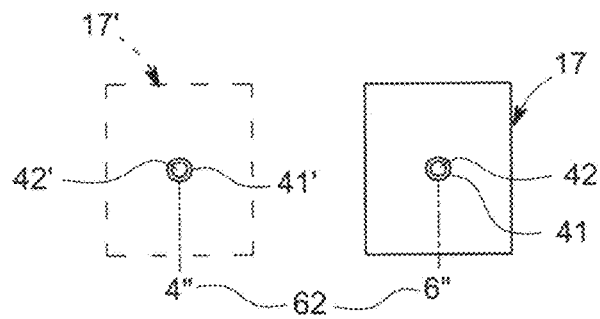
FIG. 4
FIG. 5
FIG. 6

LIGHT FIXTURE MOUNTING BRACKET ASSEMBLY

FIELD OF THE INVENTION

The present invention relates to light fixture mounting assemblies and more specifically to a mounting plate assembly provided with an adjustable spring clamps which permits the mounting of a light fixture in existing holes of varying sizes formed in sheet material and wherein the adjustable spring clamps can be secured at different. positions by a user person without the use of tools.

BACKGROUND OF THE INVENTION

LED light fixtures have become very popular due to the many advantages and features that they provide over old incandescent fixtures and there exists a growing., need to replace the old fixtures with new modern light fixtures using LED lamps or small incandescent bulbs. However, the existing fixtures to be; replaced are either secured to junction € boxes or are of the canister type mounted in holes formed in sheeting Material such as gypsum board material. These existing mountings, when the fixture is removed for replacement, produce holes of varying sizes in the sheeting material dependent on the type of the lighting fixture previously installed. This is troublesome in that it places a restriction on the type of replacement fixture that can fit the hole or requires carpentry work to modify the hole or repair the sheeting material to seal the hole and form a new one and creating a need to relocate the electrical wiring and particularly so with recessed light fixtures wherein the light bulbs (s) is secured in a recess can wherein the can. Such recessed cans are available in different diameters, for example 2, 4 or 6 inches in diameter. Therefore, this produces added costs to the end user or a restriction on the type of light fixture that can be substituted.

Other light fixture restrictions imposed with replacement light fixtures is the shape of the fixture and the location of the existing junction box and size which in most instances is secured to a stud and this again can cause a restriction on the type of substitute light fixture to be mounted on the junction box. It would be advantageous to have a light fixture which can be mounted on existing junction boxes of different diameters as well as having the option of being able to be mounted in existing canister holes of different diameters. it would further be advantageous to provide a light fixture mounting assembly having a junction box which would permit replacement of existing mounting boxes regardless of its diameter or to permit relocation of the light fixture by sealing off the junction box and relocating its power leads. Another desirable need would be to provide a light fixture mounting assembly incorporating a driver circuit housing which an fit into an existing hole or an enlarged hole provided in sheet material or in an existing junction box for connection to the power leads and to add further LED light fixtures drawing power from the existing junction box.

It would also be advantageous to provide a light fixture mounting assembly secured to light fixtures of different forms and which mounting assembly is easily adjustable to provide such different mountings and not require the services of carpenters or electricians to install. A still further need is to provide an adjustable spring clamp which would permit a user person to displace the spring clamp and secure it to a desired position depending on an existing hole diameter and without the use of tools.

SUMMARY OF THE INVENTION

It is a feature of the present invention to provide a mounting plate assembly and an adjustable spring clamp which can provide the above mentioned needs to overcome the above mentioned disadvantages concerning the mounting of light. fixtures in existing mounting holes of varying sizes and which provides at least all of the desired advantages.

Another feature of the present invention is to provide a mounting plate assembly for mounting a light fixture and incorporating a mounting assembly which can be adjusted to mount the light fixture in mounting holes of varying sizes and which does not require tools to secure the mounting assembly to such holes.

A further feature of the present invention is to provide a mounting plate adapted to connect to junction boxes of different diameters as well as to be mounted in mounting holes of different sizes formed in a sheet material.

Another feature of the present invention s to provide a mounting plate assembly having a mounting plate on which is secured displaceable spring clamps which are easily adjustable without the use of tool for adjustment to mount and retain a light fixture in existing holes of varying sizes formed in sheet material.

A still further feature of the present invention is to provide a light fixture incorporating a mounting plate assembly comprised of to a mounting plate to which is mounted a junction box and sliding spring clamps which permits the flush mounting of additional light fixtures at different locations and connected by wiring to the power leads originating from an existing junction box and to which a replacement fixture is secured by the mounting plate of the present invention.

A further feature of the present invention is to provide a light fixture incorporating a mounting plate assembly having a mounting plate provided with a driver housing secured thereto for connection to power leads and wherein the mounting plate is provided with displaceable spring clamps which are adjustable to mount and retain the light fixture and the driver housing in existing holes of varying sizes formed in sheet material.

Another feature of the present invention is to provide a replacement light fixture incorporating a mounting plate assembly having a mounting plate to which is removably secured a lamp structure having LED's or incandescent lamps and wherein sliding spring clamps are adjustably mounted for securing the mounting plate assembly in different diameter existing holes formed in sheet material or junction boxes of different diameter to secure the light fixture thereto.

According to a still further feature of the present invention there is provided a mounting plate assembly for mounting light fixtures to holes of different sizes formed in ceiling or wall sheet material and which incorporates a novel adjustable spring clamp structure which is retained by a spring biased force and wherein a spring clamp bracket can be easily displaced by the use of a person's fingers without the use of tools to adapt to clamp for mounting in holes of different sizes.

According to another broad aspect of the present invention there is provided a novel adjustable spring clamp structure which permits the positioning and securement of a displaceable spring clamp bracket at different positions without the use of tools but simply by the fingers of a user person.

According to the above features, from a broad aspect, the present invention provides a mounting plate assembly for mounting a light fixture in holes of different diameters formed in sheet material. The mounting plate assembly comprises a mounting plate having an aperture to provide a passage therethrough. A displaceable spring clamp structure is secured to a rear face of the mounting plate on opposed sides of the aperture. Each displaceable spring clamp structure is displaceable along an associated guide rail assembly. Each displaceable spring clamp structure has a displaceable base coupled for sliding displacement along its associated guide rail assembly. A spring biased clamp arm is secured to the displaceable base. Spring biasing means is provided between the displaceable base and the guide rail assembly to urge a bottom surface of the displaceable base against an engageable surface thereunder. A retention formation is provided in the bottom surface of the displaceable base for retention coupling with a selected one of space-apart retainers immovably secured to the engageable surface and aligned with the retention formation to arrest the displaceable base at a desired location with respect to the size of a hole foxed in the sheet material and to which a light fixture is to be secured. The spring biased clamp arms provide a spring force to urge the mounting plate in a direction of the hole with the spring biased clamp arms spring biased against an inner surface of the sheet material adjacent the hole.

According to another broad aspect of the present invention there is provided an adjustable spring clamp which is comprised of a mounting base with a pair of spaced-apart substantially parallel guide rails mounted on the base. A displaceable spring clamp bracket is retained between the pair of parallel guide mils for displacement therealong. The displaceable spring clamp bracket. is secured to a displaceable base held displaceably captive between the guide rails. The displaceable spring clamp bracket has a spring biased clamp arm secured to a torsion spring supported at an elevated position by a vertical bridge support secured to the displaceable base. The spring biased clamp arm is biased in a downward direction towards an end of the mounting base by the torsion spring. Spring biasing means is provided between the displaceable base and the pair of parallel guide rails to urge a bottom surface of the displaceable base against a flat top surface of the mounting base. A retention formation is provided in the bottom surface of the displaceable base for retention coupling with a selected one of space apart retention projections immovably secured to the flat top surface of the mounting base to arrest the displaceable base at a selected location between the pair of spaced-apart guide rails whereby to position the spring biased clamp arm at a desired location.

BRIEF DESCRIPTION OF THE DRAWINGS

The above noted features of the present invention will now be described with reference to certain example embodiments, when read with reference to the accompanying drawings in which:

FIG. 4 is an exploded view of the component parts of the displaceable spring clamp structure showing the construction of its individual parts;

FIG. 5 is a fragmented section view illustrating the spring bias connection between the displaceable base and the guide rails as well as the retention formation engaged with a retention nipple head;

FIG. 6 is a bottom view of the displaceable base showing the location and shape of the retention formation and its displacement to secure it at different locations depending on the hole diameter;

DETAILED DESCRIPTION OF THE DRAWINGS

Before any embodiments of the present invention is explained in detail, it is to be understood that the application is not limited to the details of construction and the arrangement of component part set forth in the following description or illustrated by the following drawings. Further, it is to be understood that the phraseology and terminology used herein is for the purpose of description and should not be regarded as limiting but should encompass equivalents thereof.

Figure 1:
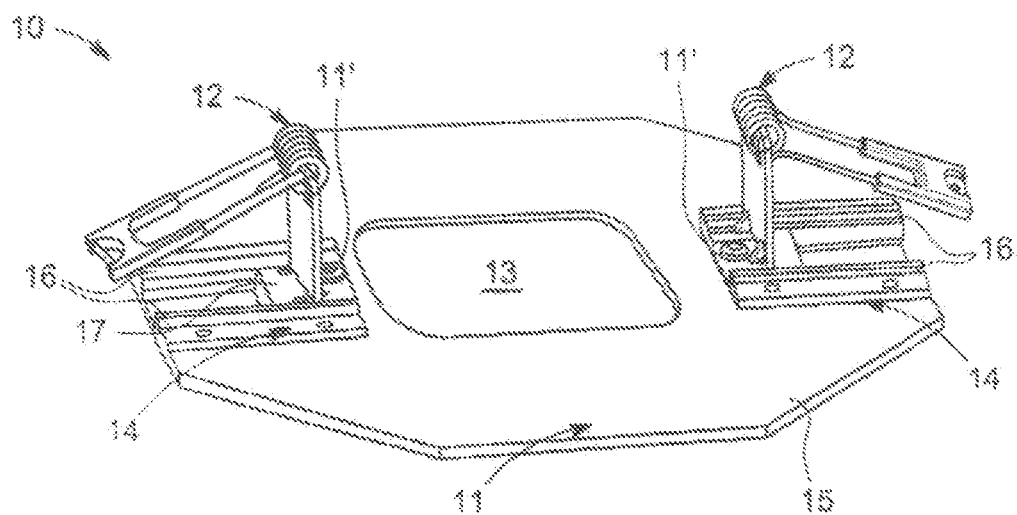
FIG. 1 is a simplified perspective view of an embodiment of the mounting plate assembly of the present invention.

Referring now to the drawings and more particularly to the example of the preferred embodiment depicted by FIGS. 1 and 4, there is shown the basic component parts of the mounting plate assembly 10 and the displaceable adjustable spring clamp structure 12. The mounting plate assembly 10 has a mounting plate 11 usually constitute by a flat metal plate provided with cut-outs and holes for attachment to an electrical junction box and providing attachment thereto of a light fixture. The mounting plate assembly 10 of the present invention provides additional functions compared to known mounting plates and is provided with a novel displaceably adjustable spring clamp structure 12 which permits the mounting of the mounting plate assembly to preformed holes of different sizes formed in sheet material. The displaceable spring clamp structure 12 can also be easily adjusted by the use of a user person's fingers without the need of tools.

The mounting plate 11 has an aperture 13 to provide a passage therethrough of wiring, when mounted over an electrical junction box, or for the mounting of a light source inside a recessed housing if the sight fixture is of a canister type, not shown but obvious to a person skilled in the art. A guide rail assembly 14 is secured to a rear face 15 of the mounting plate 11 on opposed sides of the aperture 13, and as herein show, these are diametrically aligned with one another on a straight axis. Each guide rail assembly 14 supports an adjustable spring clamp bracket 20 mounted for its displacement along a pair of guide rails 16. The spring clamp bracket 20 is connected to a displaceable base 17 coupled for sliding displacement along and between its associated guide rails 16 to position the spring clamp bracket 20 at a desired location. The displaceable base 17 is arrested at the desired location by retention means, as described herein below, to permit and the mounting of the mounting plate assembly in a pre-formed hole of a certain diameter whereby to mount a new light fixture attached to such hole.

As shown in the exploded view of FIG. 4, the displaceable spring clamp structure 12 is described. The guide rail assembly 14 comprises a mounting base 21 to which is integrally formed the pair of spaced-apart substantially parallel guide rails 16. The displaceable spring clamp bracket 20 is retained between the pair of parallel guide rails 16 for displacement therealong. The displaceable spring clamp bracket 20 is secured to the displaceable base 17 which is held displaceably captive between the guide rails 16. The displaceable spring clamp bracket 20 has a spring biased clamp arm structure 22 secured to a torsion spring 23 supported at an elevated position by a horizontal bridge arm support 24 formed at a top end of a vertical bridge support plate 25 secured to the top surface 31 of the displaceable base 17 by an attachment flange 28 and a screw fastener 29 which engages in a preformed screw retention hole 30 in the top surface 31 of the displaceable base 17.

The torsion spring 23 has a helical spring section 23' retained about the bridge arm support 24 and its opposed ends are formed as straight arms 32' disposed parallel to one another and extending in a common plane. The free ends of the straight arms 32' are interconnected by a surface engaging pad structure 33' formed of plastics material or other material not to damage the interior surface of the gypsum board sheeting material to which it is usually spring biased against. The spring biased clamp arm structure 22 is spring biased in a downward direction, as illustrate by arrow 27 by the torsion spring 23 and the pad structure 33' rests in a full downward position. Therefore, to position the spring clamp structures 12 in a hole, it is necessary to move the spring biased clamp arms of the clamp brackets 20 upwardly to place then in the hole while pushing the mounting plate towards the hole. The clamp arms are release as soon as the engaging pads 33' are inside the hole, and all of this procedure is well known in the art As herein shown, the displaceable base 17 is formed of a rigid metal piece of rectangular shape and defines a flat top surface 31 and flat bottom surface 31'. The displaceable base is also formed with opposed flange formations 32 which project outwardly from a bottom section of the opposed side walls 33 of the displaceable base 17. The opposed guide rails 16 are formed with inwardly projecting shoulder formations 34 spaced above the flat top surface 26 of the mounting base 21 to form an open elongated channel 35 thereunder with the opening of the channel facing inwards over the flat top surface 26 of the mounting base 21. As shown in FIG. 5, these channels 35 have a height "h" greater than the thickness "t" of the flange formations 32 whereby to define a space 36 therebetween when said shoulders of said displaceable base is positioned thereunder, as herein illustrated. The flange formations 32 are elongated flat flanges of rectangular cross-section. In this particular embodiment the guide rail 16 is further provided with an attachment flange 16' provided with holes 16" for receiving fasteners (not shown) for securing the displaceable spring clamp structure 12 in u-shaped openings 11' formed in the mounting plate 11 on opposed sides of the aperture 13. This is only one form of attachment of the displaceable clamp structure and other modifications are to be contemplated if it is to be mounted differently depending on the shape and mounting structure of different types of light fixtures.

Spring biasing means is mounted in a top surface 37 of the flange formations 32 to receive a spring elements 38 in the form of a small compression helical spring module sized for retention in a small retention hole 39 formed in the top surface 37 of the flange formation 32. The spring elements 38 have a friction head 40 to provide a smooth wear-resistant surface for displacement against an underface 34' of the shoulder formations 34. As shown in FIG. 5, the opposed flange formations 32 of the displaceable base 17 project under the shoulder formations 34 in the space 36 when the displaceable base is secured to the guide rail assembly 14 for displacement therealong. The spring, elements 38 spring biases the bottom surface 31' of the displaceable base 17 against the flat top surface 26 of the mounting base 21.

Figure 3:
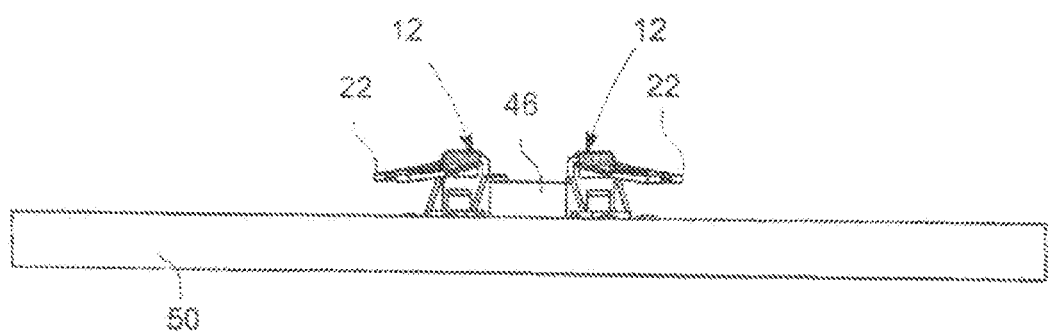
FIG. 3 is a side view of FIG. 2.

With additional reference to FIG. 6, which is a bottom view of the displaceable base 17', it can be seen that a retention formation, in the shape of a hole 41, is formed at a predetermined position in the bottom surface 31' of the displaceable base. As shown in FIGS. 3 and 5, retention formations in the form of rounded nipple heads 42 are secured to the flat top surface 26 of the mounting base 21 and disposed in predetermined spaced relationship along a straight axis which is aligned with the hole 41. Accordingly, when the displaceable base 17 is moved over the flat top surface 26 of the mounting base 21, and the hole 41 of the displaceable base is located over a nipple head 41, the displaceable base is arrested by the downward spring force exerted by the spring elements 38. In order to displace the displaceable base 17 over the flat top surface 26 of the mounting base 21 it is necessary for a user person to apply an upward pulling force on the displaceable base, to disconnect it from engagement with a nipple head, and this is accomplished by grasping the spring clamp bracket 20 with the fingers and pulling it upwards causing the spring elements 38 to compress and the displaceable base to move upwards out of its engagement. The displaceable base is then shifted toward another nipple head see 42' in FIG. 6, and released when in the vicinity of the other nipple head whereby its bottom surface 36 is biased against the other nipple head by the spring elements 38 and the hole will then clamp over the other nipple head as shown at 41' being clamped over the nipple head at 42'. Accordingly, the spring clamp bracket immovably retained at a different location, As herein shown, two spaced nipple heads 42 are secured at predetermined locations corresponding to known hole sizes, such as holes of 4 or 6 inches. To identify the positioning of the base to place the spring clamp brackets at the proper position depending on the hole site, markings 62 can be printed or inscribed on the top surface of the guide rails 16, as shown in FIG. 4. FIG. 6 illustrates the base 17 engaged at these two positions of 4 and 6 inch spacing.

Figure 2:
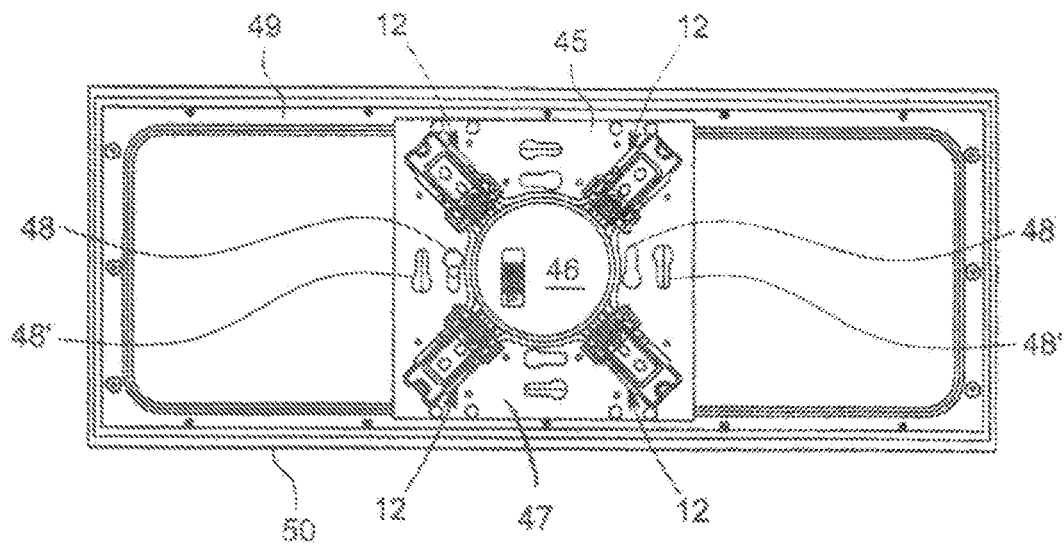
FIG. 2 is a rear top view of an example of another embodiment of the mounting plate assembly as secured to a flat rectangle shaped light fixture.

With reference to FIGS. 2 and 3, there is illustrated a mounting plate assembly 45 wherein the mounting plate 47 is of a square contour and has an LED driver module 46 mounted thereon. The aperture 13 provides access to the driver module 46 to connect wiring to provide operating current to LED lamps provided in a light fixture (not shown) securable to the mounting plate. Also, four displaceable spring clamp brackets 12 are mounted thereon and disposed in two pairs with the spring clamp brackets diametrically aligned and the pairs secured at right angles to one another. Such is desirable when supporting heavy light fixtures. As can be seen, the mounting plate 47 is herein provided with junction box attachment slots 48 and 48' disposed on two spaced-apart circumferential axes to provide a different use for the mounting plate for connection to existing junction boxes of two different diameters and connectable thereto by screw fasteners. Accordingly, when the mounting plate 45 with the driver module 46 is secured to a junction box the power leads of the junction box secured to the LED driver module 46, with the module being of a small size housed within the junction box. As herein shown the LED light fixture frame 49 is secured to the mounting plate 47 by proper fasteners and its lens cover 50 thereafter attached to the frame 49 by conventional fasteners.

Figure 9:
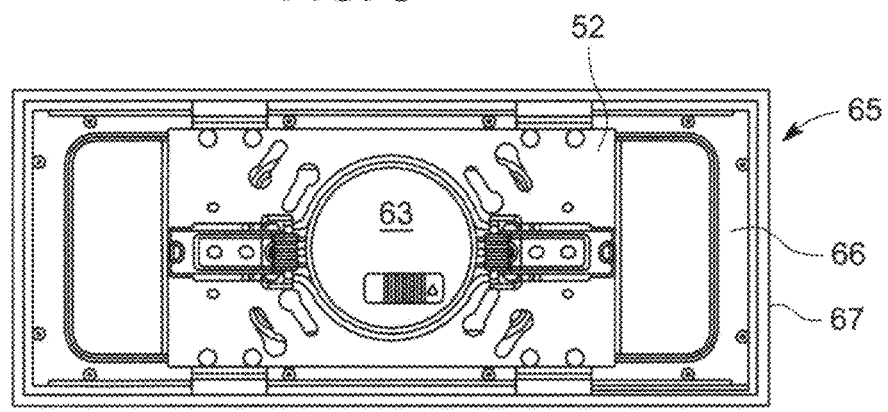
FIG. 9 is a rear top view of an example of another embodiment of the mounting plate assembly as secured to a rectangular mounting plate to which is connected a rectangular light fixture.
Figure 10:
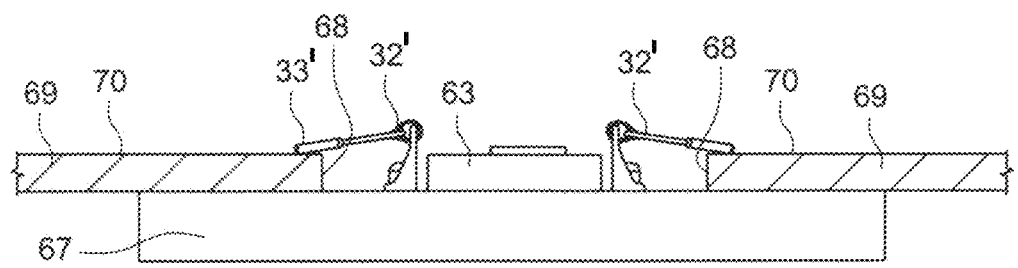
FIG. 10 is a side view of FIG. 9.

FIGS. 9 and 10 show as similar mounting assembly to that of FIGS. 2 and 3 but showing that the mounting plate 52 can be constructed of a different configuration, herein an elongated rectangular mounting plate and provided with only two displaceable clamp structure 12 secured in diametrical alignment. As shown, a junction box 63 or LED module 46 is mounted on the mounting plate 52. FIGS. 9 and 10 further illustrates the mounting plate 52 being attached to an elongated LED light fixture 65 and wherein the mounting plate 52 is secured to its frame 66 to which is attached a lens 67, FIG. 10 shows the LED light fixture 65 mounted in a hole 68 formed in sheeting material 69 with the spring biased clamp arms 32' spring biased over the inner surface 70 of the sheeting material adjacent the bole 68.

Figure 7:
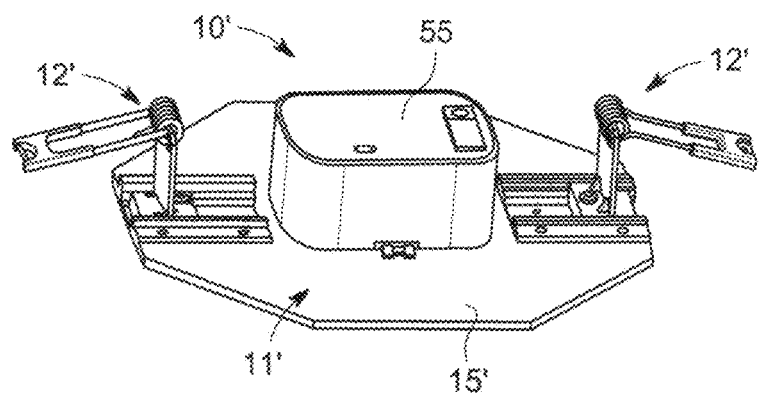
FIG. 7 is a perspective view similar to FIG. 1 but showing an example of a further embodiment wherein an electrical junction box. is secured to the mounting plate over the aperture.
Figure 8:
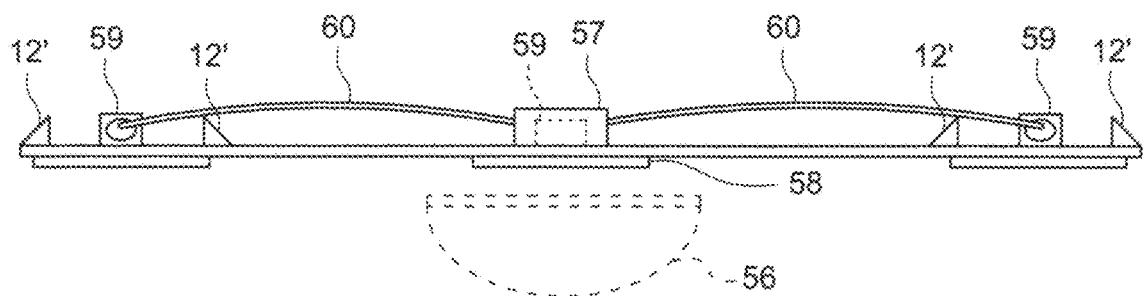
FIG. 8 is a simplified side view showing the replacement of an existing light fixture by the use of the mounting plate of FIG. 1 and the securement of additional mounting plates of the embodiment of FIG. 9 with the power leads from the existing junction box providing power to the additional mounting plate assemblies whereby an existing light fixture can be replaced by two or more different light fixtures.

With reference to FIGS. 7 and 8, there is shown a mounting plate assembly 10' similar to FIG. 1, but wherein a junction box 55 is mounted about the aperture 13 which in this figure is concealed by the junction box 55 secured. to the rear wall 15' of the mounting plate 11'. The aperture 13 provides access to the junction box 55. The mounting plate 15' may have different contour shapes, such as hexagonal as herein illustrated, or round, square or rectangular as shown in FIGS. 2 and 9, or variations thereof. Such an embodiment is desirable when replacing an existing light fixture with additional and different light fixtures. Such is illustrated in FIG. 8, wherein an old fixture 56, shown in phantom line, is removed from its junction box 57 and replaced by a more modern LED light fixture 58 having its driver module 59 which mounts inside the junction box 57 and further wherein additional LED light fixtures 58' can be mounted at different locations with their power received from jumper wires 60 coupled to the power leads existing in the junction box 57. Accordingly, such mounting plate assembly 10' permits a user person to replace an existing fixture, such as a chandelier or any type, with one or more modern LED fixtures or incandescent lamp fixtures of a different designs and such replacement can be made by a user person without the use of electricians or carpenters. The only work requirement is to remove the existing light fixture assembly and to disconnect its connecting wires from the power leads from the junction box. Holes are cut into the sheeting material at desired locations where additional replacement light fixtures 58' need to be mounted and to bring the additional wiring 60 from the junction box to the new mounting holes to connect to the new fixtures and to mount the new fixtures in the holes by the use of the spring clamps 12', as shown in FIG. 8.

Many modifications and other embodiments of the present invention as described above will come to mind to a person skilled in the art to which the invention pertains having the benefit of the teachings described herein above and the drawings. Hence, it is to be understood that the embodiments of the present invention are not to be limited to the specific examples thereof as described herein and other embodiments are intended to be included within the scope of the present invention and the appended claims. Although the foregoing descriptions and associated drawings describe example embodiments in the context of certain examples of the elements and members and/or functions, it should be understood that different combinations of elements or substitutes and/or functions may be provided by different embodiments without departing from the scope of the present invention as defined by the appended claims. Furthermore, although specific terms are employed herein, they are used in a generic and descriptive sense only and other equivalent terms are contemplated herein with respect to the items that they relate to. It is therefore within the ambit of the resent invention to encompass all obvious modifications of the examples of the preferred embodiment described herein provide such modifications fall within the scope of the appended claims.

The invention claimed is:

1. A mounting plate assembly for mounting a light fixture adjacent to a hole, the mounting plate assembly comprising:
   a mounting plate;
   one or more displaceable spring clamp structures displaceably secured to a face of the mounting plate, the one or more displaceable spring clamp structures comprising:
      a displaceable base displaceable along a guide rail assembly secured to the face of the mounting plate;
      a spring biased clamp arm secured to the displaceable base, wherein the spring biased clamp arm biases against a surface and urges the mounting plate in at least a direction of the hole; and
      a retention formation provided in a face of the displaceable base, the retention formation being couplable with one or more retainers secured to an engageable surface of the guide rail assembly to arrest the displaceable base at one or more positions adjacent to the engageable surface, wherein the retainers are formed from the engageable surface.

2. The mounting plate assembly of claim 1, further comprising:
   spring elements between the displaceable base and the guide rail assembly to urge the face, or another face, of the displaceable base against the engageable surface, or another engageable surface, of the guide rail assembly.

3. The mounting plate assembly of claim 1, wherein the mounting plate includes one or more apertures providing a passage therethrough.

4. The mounting plate assembly of claim 1, wherein the one or more retainers are spaced apart and the retention formation is couplable with one retainer, of the one or more retainers, at a time.

5. The mounting plate assembly of claim 4, wherein the displaceable base is displaceable from one retainer to another retainer, of the one or more retainers.

6. The mounting plate assembly of claim 1, wherein the one or more displaceable spring clamp structures are displaceable to a first displaceable position for passage through the hole, and are displaceable to a second displaceable position for inhibiting removal of the one or more displaceable spring clamp structures from the hole.

7. The mounting plate assembly of claim 1, wherein the guide rail assembly comprises opposed straight guide rails adjacent to the displaceable base in spaced parallel relationship, and wherein the displaceable base is retained for captive displaceable retention between opposed elongated channels formed by said guide rails.

8. A mounting plate assembly for mounting a light fixture adjacent to a hole, the mounting plate assembly comprising:
   a mounting plate;

one or more displaceable spring clamp structures displaceably secured to a face of the mounting plate, the one or more displaceable spring clamp structures comprising:
- a displaceable base displaceable along a guide rail assembly secured to the face of the mounting plate;
- a spring biased clamp arm secured to the displaceable base, wherein the spring biased clamp arm biases against a surface and maintains the mounting plate in one or more positions relative to the hole; and
- a retention formation provided in a face of the displaceable base, the retention formation being couplable with one or more retainers secured to an engageable surface of the guide rail assembly to arrest the displaceable base at one or more positions adjacent to the engageable surface, wherein the retainers are formed from the engageable surface.

9. The mounting plate assembly of claim 8, further comprising:
spring elements between the displaceable base and the guide rail assembly to urge the face, or another face, of the displaceable base against the engageable surface, or another engageable surface, of the guide rail assembly.

10. The mounting plate assembly of claim 8, wherein the mounting plate includes one or more apertures providing a passage therethrough.

11. The mounting plate assembly of claim 8, wherein the one or more retainers are spaced apart and the retention formation is couplable with one retainer, of the one or more retainers, at a time.

12. The mounting plate assembly of claim 11, wherein the displaceable base is displaceable from one retainer to another retainer, of the one or more retainers.

13. The mounting plate assembly of claim 8, wherein the one or more displaceable spring clamp structures are displaceable to a first displaceable position for passage through the hole, and are displaceable to a second displaceable position for inhibiting removal of the one or more displaceable spring clamp structures from the hole.

14. The mounting plate assembly of claim 8, wherein the guide rail assembly comprises opposed straight guide rails adjacent to the displaceable base in spaced parallel relationship, and wherein the displaceable base is retained for captive displaceable retention between opposed elongated channels formed by said guide rails.

15. A mounting plate assembly for mounting a light fixture adjacent to a hole, the mounting plate assembly comprising:
a mounting plate;
one or more displaceable spring clamp structures secured to a face of the mounting plate, the one or more displaceable spring clamp structures comprising:
- a displaceable base displaceable along one or more portions of the mounting plate assembly; and
- a spring biased clamp arm secured to the displaceable base, wherein the spring biased clamp arm biases against a surface and urges the mounting plate in a maintained position relative to the hole, and
- a retention formation that is provided in the face of the displaceable base and that receives one or more retainers formed from a surface beneath the displaceable base.

16. The mounting plate assembly of claim 15, further comprising:
spring elements biasing the displaceable base towards an engageable surface of the mounting plate assembly.

17. The mounting plate assembly of claim 16, further comprising:
a retention formation provided in a face of the displaceable base, the retention formation being couplable with the one or more retainers secured to the engageable surface, wherein coupling of a retainer, of the one or more retainers, with the retention formation arrests the displaceable base at a position, of one or more positions, along the engageable surface.

18. The mounting plate assembly of claim 17, wherein the one or more retainers are spaced apart and the retention formation is couplable with one retainer, of the one or more retainers, at a time.

19. The mounting plate assembly of claim 18, wherein the displaceable base is displaceable from one retainer to another retainer, of the one or more retainers.

20. The mounting plate assembly of claim 15, wherein the mounting plate includes one or more apertures providing a passage therethrough.

* * * * *